United States Patent
Barton et al.

(10) Patent No.: US 11,282,160 B2
(45) Date of Patent: Mar. 22, 2022

(54) FUNCTION-AS-A-SERVICE (FAAS) MODEL FOR SPECIALIZED PROCESSING UNITS

(71) Applicant: Cisco Technology, Inc., San Jose, CA (US)

(72) Inventors: Robert Edgar Barton, Richmond (CA); Jerome Henry, Pittsboro, NC (US); Russell Paul Gyurek, Raleigh, NC (US); Frank Brockners, Cologne (DE)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/817,390

(22) Filed: Mar. 12, 2020

(65) Prior Publication Data

US 2021/0287323 A1  Sep. 16, 2021

(51) Int. Cl.
*G06T 1/20* (2006.01)
*G06F 9/50* (2006.01)
*G06F 9/38* (2018.01)
*G06F 9/54* (2006.01)
*G06F 15/80* (2006.01)

(52) U.S. Cl.
CPC .............. *G06T 1/20* (2013.01); *G06F 9/3877* (2013.01); *G06F 9/5038* (2013.01); *G06F 9/547* (2013.01); *G06F 15/80* (2013.01)

(58) Field of Classification Search
CPC ....... G06T 1/20; G06F 9/3877; G06F 9/5038; G06F 9/547; G06F 15/80
USPC .......................................... 345/501, 502, 503
See application file for complete search history.

(56) References Cited

U.S. PATENT DOCUMENTS

| 9,830,677 | B2 | 11/2017 | Gandhi et al. |
| 10,109,030 | B1 | 10/2018 | Sun et al. |
| 10,178,046 | B1 | 1/2019 | Murugesan et al. |
| 10,373,284 | B2 | 8/2019 | Kurtz et al. |
| 2013/0235053 | A1* | 9/2013 | Bourd .................. G06F 9/5044 345/522 |

(Continued)

FOREIGN PATENT DOCUMENTS

WO    WO2005089246 A2    9/2005

OTHER PUBLICATIONS

"Scaling GPU Deployments", iguazio.com, retrived on Dec. 20, 2019, 11 pages.

(Continued)

*Primary Examiner* — Jacinta M Crawford
(74) *Attorney, Agent, or Firm* — Lee & Hayes, P.C.

(57) ABSTRACT

A server that includes a graphics processing unit (GPU) may receive, from a first application that is remote from the server, a first request to reserve a first number of cores of the GPU for a first amount of time. The server may also receive, from a second application that is also remote from the server, a second request to reserve a second number of cores of the GPU for a second amount of time that at least partly overlaps the first amount of time. The server may determine that the first request is associated with a higher priority than the second request and, in response, may reserve the first number of cores for the first amount of time for the first application. The server may send, to the first application, an indication that the first number of cores have been reserved as requested by the first application.

20 Claims, 8 Drawing Sheets

(56) References Cited

U.S. PATENT DOCUMENTS

| | | |
|---|---|---|
| 2017/0256018 A1 | 9/2017 | Gandhi et al. |
| 2019/0132257 A1* | 5/2019 | Zhao .................... H04L 47/803 |
| 2019/0171489 A1 | 6/2019 | Guo et al. |
| 2019/0272461 A1 | 9/2019 | Ravindranath |

OTHER PUBLICATIONS

PCT Search Report and Written Opinion dated May 10, 2021 for PCT Application No. PCT/US21/17906, 16 pages.

* cited by examiner

FUNCTION-AS-A-SERVICE (FAAS) MODEL FOR SPECIALIZED PROCESSING UNITS

TECHNICAL FIELD

The present disclosure relates generally to providing specialized processing units, such as graphics processing units (GPUs), tensor processing units (TPUs), and the like, as a service, making cores of the specialized processing units available to edge client computing devices.

BACKGROUND

In today's world of ubiquitous computing, architectures continue move towards edge computing, in which computing devices acquire and process data as close to the source as possible. Edge computing provides many benefits including reduced latency and reduced data bandwidth costs across a network. Some types of processing, however, may be so intensive so as to require more power than many some edge computing devices can deliver. Thus, edge computing faces a conflict between continuing to push data processing further towards the source without necessitating the addition of expensive hardware on the ever-increasing number of edge computing devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
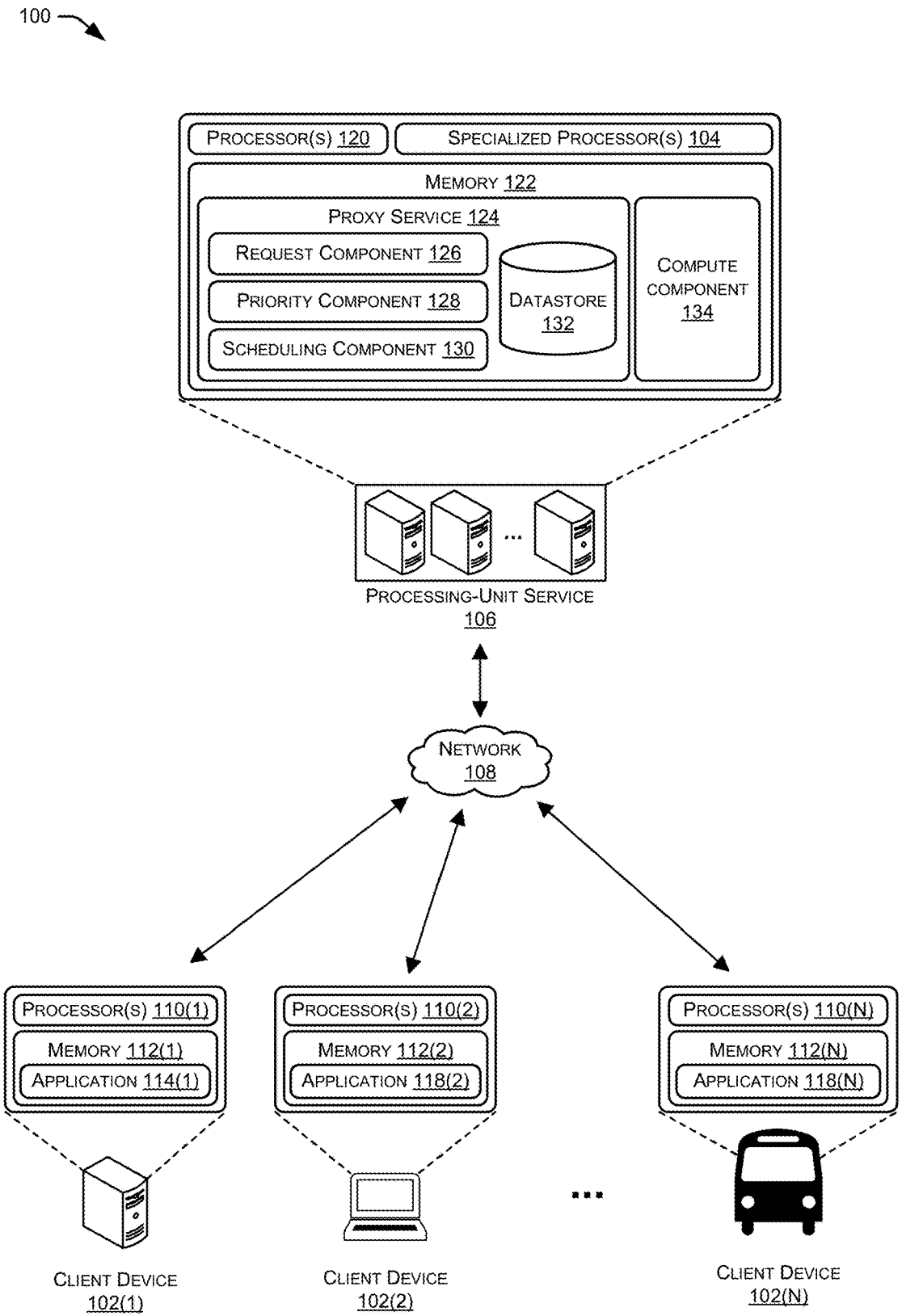
FIG. 1 illustrates a system-architecture diagram of an example environment in which a processing-unit service is accessible to different client devices over a network. Within the illustrated environment, each client device may comprise an edge computing device configured to process some data locally, while calling on cores of one or more specialized processing units (e.g., a graphics processing unit (GPU) of the processing-unit service) for the performance of certain parallel, intensive computational tasks. In some instances, the processing-unit service includes a proxy service configured to receive requests for cores, determining respective priorities of the requests, and allocate usage of the cores accordingly.

This disclosure describes, in part, a method that includes receiving, at a server that includes a graphics processing unit (GPU) and from a first application that is remote from the server, a first request to reserve a first number of cores of the GPU for a first amount of time. The method further includes receiving, at the server and from a second application that is remote from the server and remote from the first application, a second request to reserve a second number of cores of the GPU for a second amount of time that at least partly overlaps the first amount of time. The method may also include determining, by the server, that the first request is associated with a higher priority than the second request, as well as reserving, by the server and based at least in part on the determining, the first number of cores for the first amount of time for the first application. In addition, the method may include sending, by the server and to the first application, an indication that the first number of cores have been reserved for the first amount of time for the first application.

This disclosure also describes, in part, a method implemented at least in part by a system that includes a specialized processing unit (e.g., a graphics processing unit (GPU), a tensor processing unit (TPU), etc.), with the method including receiving, from a first application that is remote from the system, a first request to reserve a first number of cores of the specialized processing unit for a first amount of time. The method may further include receiving, from a second application that is remote from the system and remote from the first application, a second request to reserve a second number of cores of the specialized processing unit for a second amount of time that at least partly overlaps the first amount of time, as well as determining that the first request is associated with a higher priority than the second request. The method may also include reserving, based at least in part on the determining, the first number of cores for the first amount of time for the first application and sending, to the first application, an indication that the first number of cores have been reserved for the first amount of time for the first application.

Additionally, the techniques described herein may be performed via methods, devices, systems, and/or non-transitory computer-readable media storing computer-executable instructions that, when executed by one or more processors, performs the techniques described herein.

Example Embodiments

As described above, computing architectures continue move towards edge computing, in which computing devices acquire and process data as close to the source as possible. Edge computing provides many benefits including reduced latency and reduced data bandwidth costs across a network. Some types of processing, however, may be so intensive so as to require more power than many some edge computing devices can deliver. Thus, edge computing faces a conflict between continuing to push data processing further towards the source without necessitating the addition of expensive hardware on the ever-increasing number of edge computing devices.

Described herein are techniques to enable edge computing devices to perform serial, non-intensive computing tasks locally, using processors onboard the edge devices, while utilizing cores of specialized processing units of a processing-unit service for intensive, parallel tasks. Thus, the described techniques effectively create an environment where cores of specialized processing units may be accessed in a function as a service (FaaS) model. For example, each client computing device operating at the edge may include some pieces of code that perform computational tasks locally, and other pieces of code that, when invoked, request cores of the FaaS model. Examples of computational tasks that may be performed using cores of one or more specialized processing units of the FaaS include computer vision, video analytics, natural language processing (NLP), graphics processing, inference machine learning (ML) training, artificial intelligence (AI), and the like.

In some instances, the processing-unit service resides "in the cloud" and, thus, is accessible to multiple different client computing devices over the Internet and/or other networks. Further, the processing unit service may include one or more graphics processing units (GPUs), tensor processing units (TPUs), edge-TPUs, and/or other specialized processing units configured to perform intensive computations. Of course, while the processing-unit service may reside in the cloud, it may alternatively reside anywhere "higher up" in the network, such as at an internet of things (IoT) aggregation point, a multi-access edge computing (MEC) node, a higher-level data center, or the like.

The processing-unit service may include a proxy service configured to receive the different requests for cores of the specialized processing units and allocate and schedule cores accordingly. For example, each request from a client computing device operating at the edge may include one or more parameters. These parameters may include a number of cores requested, a length of time for which the cores are requested, a time range over which the cores have been requested, a type of task that the client computing device would like to perform on the cores, a priority of the task, a quality of service (QoS) level that the processing-service unit has previously agreed to provide to the client computing device, a billing model between the processing-unit service and the client computing device, or the like. The request may further include security or authentication credentials for authenticating the client computing device at the proxy service of the processing-unit service.

Upon receiving a request, in some instances the proxy service may assign a priority level to the request for determining whether the priority of the request is greater or less than one or more other requests. For example, if the request conflicts with another request, such that the processing-unit service is unable to fulfill both requests in the manner requested, the proxy service may use respective priority levels to determine which request to fulfill and which to deny or modify. Modifying a request may include allocating fewer cores than requesting, allocating cores at a different (e.g., later) time than requested, and/or the like.

The proxy service of the processing-unit service may maintain, in one or more data stores, data (e.g., a map) indicating information such as a total capacity (e.g., number of cores) of the processing unit service, a current capacity (e.g., number of available cores), capacity currently being used (e.g., an in-use core count), a schedule of current reservation of the cores (e.g., the time ranges for which cores are reserved, now and/or in the future), the location of the capacity (e.g., core locations), and/or the like. The proxy service may use this information, along with information included in respective requests and/or the determined priority of the requests, to determine how to respond to the requests.

For example, the proxy service may respond to the requests by reserving one or more cores on behalf of the application. For example, envision that an application executing on a client computing device requests, via an application programming interface (API) provided by the proxy service, to reserve and utilize two hundred (200) cores for ten minutes. In response to receiving the request, the proxy service may access the data store to determine whether the processing-unit service is able to meet the request. If so, the proxy service may store an indication that 200 identified cores of the processing-unit service for a defined time range having a length of ten minutes, and the proxy service may send, to the application, an indication that the cores have been reserved along with an indication of a location of the cores. In another example, rather than provide the location, the proxy service may instead redirect subsequent traffic flow from the application to the appropriate location. If, however, the cores are unavailable (that is, the processing-unit service is unable to meet the request), the proxy service may send a decline message to the application, which can look for available resources in another location. In another example, the proxy service may return an indication of an amount of time at which point the cores will become available (e.g., "requested resources will be available in ten seconds"). In still another example, the proxy service may return an indication that the processing-unit may meet a portion of the request (e.g., "80 cores available now") and/or an indication that additional cores will become available at a later time (e.g., "120 remaining cores will be available in fifteen second").

Once the proxy service has reserved the cores, the application executing on the edge is now able to communicate with the appropriate computing device(s) via the API service provided by the processing-unit service. This service assigns the requested task to the cores that have been reserved for this task. In this way, groupings of cores can be used by multiple systems at the same time. In the same manner, a GPU or other specialized processing unit may be shared and sub-divided to run more than one task from multiple applications simultaneously. Once the task is finished (or the reservation for the cores has expired) the proxy service may release the lock on the cores such that the cores may now be reused for other tasks by the same or other applications operating at the edge.

As noted above, when requested tasks conflict with one another, the requests may be ranked by priority, as determined by the proxy service based on respective attributes associated with the requests. For example, requests (or applications/edge computing devices from which the requests originate) with higher priority may take precedence over lower requests. In these instances, the proxy service may arbitrate contention for core space based on, for example, the attributes discussed above, such as application priority, pay and billing model, length of time the cores are required for, and/or the like.

In some instances, the proxy service is configured to optimize the core allocation based on configurable constraints. For example, the proxy service may be set to allocate tasks to spread the load across multiple GPUs or other specialized processing units. The proxy service of the processing-unit service may be set to position the data processing task to the GPUs or other specialized processing units that are linearly closest to the path between the client computing device and the main cloud server, thus saving on network data processing and bandwidth. In addition, or in the alternative, the proxy service may be configured to allocate resources based on the task type (e.g. T-GPUs may be utilized for image processing tasks, etc.) Further, in some instances the proxy service may allocate the closest resource from an overall delay perspective, with the delay being actively measured or implicitly measured (e.g., using In-band Operations, Administration, and Maintenance (IOAM) techniques).

The techniques are described further with reference to FIGS. 1-7. It is to be appreciated that these figures and corresponding discussion describe example architectures and embodiments, and that the techniques may be implemented in other, non-illustrated architectures and embodiments.

FIG. 1 illustrates a system-architecture diagram of an example environment 100 in which one or more client computing devices 102(1), 102(2), ..., 102(N) operating at the edge of a network are able to access one or more specialized processing units (or "processors") 104 of a processing-unit service. The client computing devices 102(1)-(N) may comprise any sort of computing device of any form factor, such as standalone server computing devices, personal computing devices, computing devices onboard security cameras, security devices onboard transportation vehicles, and/or the like, without limitation. The specialized processing units 104, meanwhile, may comprise graphics processing units (GPUs), tensor processing units (TPUs), edge-TPUs, and/or any other type of specialized processing units comprising multiple cores configured to perform intensive computational processing. In some instances, the client computing devices 102(1)-(N) are able to access the processing-unit service 106 over one or more networks 108, which may comprise the Internet and/or one or more other public and/or private networks. In some instances, the processing-unit service 106 resides in the cloud, while in other instances it may reside anywhere "higher up" in the network, such as at an internet of things (IoT) aggregation point, a multi-access edge computing (MEC) node, a higher-level data center, or the like.

Each illustrated client computing client device 102(1)-(N) may comprise an edge computing device configured to process some data locally, while calling on cores of one or more specialized processing units 104 (e.g., a graphics processing unit (GPU) of the processing-unit service 106) for the performance of certain parallel, intensive computational tasks. As illustrated, each of the client computing devices 102(1)-(N) may include respective processors 110(1), 110(2), ..., 110(N) and memory 112(1), 112(2), ..., 112(N), each of which may store one or more respective applications 114(1), 114(2), ..., 114(N). The local processors 110(1)-(N) may comprise one or more central processing units (CPU), but for cost reasons the client computing devices 102(1)-(N) may be free of specialized, higher-power processors, such as GPUs, TPUs, edge-TPUs, and/or the like.

Within the environment 100, the client computing devices 102(1)-(N) may access the specialized processing units 104 via a function as a service (FaaS) model. For example, each of the applications 114(1)-(N) of the client devices are configured to utilize first portion(s) of code that execute functions locally and second portion(s) of code that call a function that requests the reservation and utilization of cores of the specialized processing unit(s) 104 of the processing-unit service 106 for the performance of computationally intensive tasks. Examples of computational tasks that may be performed using cores of one or more specialized processing units 104 of the FaaS include computer vision, video analytics, natural language processing (NLP), graphics processing, inference machine learning (ML) training, artificial intelligence (AI), and the like.

As illustrated, the processing-unit service 106 includes one or more processing units (or "processors") 120 and the one or more specialized processing units 104. The processors 120 may represent central processing units (CPUs) that execute the code stored on memory 122. As illustrated, the memory 122 may store a proxy service 124 configured to receive requests for cores of the specialized processing units 104, determine respective priorities of the requests, and allocate usage of the cores accordingly.

The proxy service 124 may include a request component 126, a priority component 128, and a scheduling component 130, as well as a data store 132. The request component 126 may receive requests for cores of the specialized processing units 104 from applications 114(1)-(N) of the one or more of the client computing devices 102(1)-(N). As noted above, the requests may include one or more parameters, such as a number of cores requested, a length of time for which the cores are requested, a time range over which the cores have been requested, a type of task that the application would like to perform on the cores, a priority of the task, a quality of service (QoS) level that the processing-service unit 104 has previously agreed to provide to the respective client computing device, a billing model between the processing-unit service 106 and the respective client computing device, or the like. The request may further include security or authentication credentials for authenticating the respective client computing device at the proxy service of the processing-unit service 106.

The priority component 128, meanwhile, may use one or more of the received parameters to determine a priority of the request. In some instances, a determined priority may represent one or more multiple priority levels (e.g., low, medium, high), while in other instances the priority may represent, for example, a normalized score (e.g., between zero, representing a lowest priority, and one, representing a highest priority). In either instance, the priority component 128 may calculate the respective priorities in any number of ways, such as using a predefined function that receives one or more of the parameters as input, based on a mapping between one or more of the parameters to a priority score or level, or the like. For example, the priority component 128 may associate certain types of tasks (e.g., computer vision, etc.) to higher priorities and other tasks (e.g., ML training) to lower priorities. In other instances, the priority component 128 may associate requests from certain applications/client computing devices to higher priority levels (e.g., based on the applications/client computing devices having received a higher QoS level), while associating requests from other applications/client computing devices to lower priority levels.

Regardless of how the priorities are calculated, the scheduling component 130 may use the respective priorities for determine how to schedule (e.g., reserve and allocate) requests from the applications. For example, in response to receiving multiple requests that conflict with one another, the scheduling component 130 may fulfill requests associated with higher priorities prior to fulfilling requests associated with lower priorities. After determining how to reserve each request, the scheduling component 130 may store an indication, in the data store 132, regarding which cores are associated with the request, the length of time and the time range that the cores are reserved, and so forth. The data store 132 may further store additional information, such as the received parameters, and the like.

After reserving cores for a particular request from an application, the proxy service 124 may send an indication of the reservation to the corresponding application. This indication may indicate the number of cores reserved (e.g., some or all requested), the time range of the reservation, and the location of the cores. Upon receiving this information, the application may begin utilizing the cores over the network 108. For example, FIG. 1 illustrates that the processing-unit service 106 may include a compute component 134 to which the application may begin interacting with to enable the allocated cores of the specialized processing unit(s) 104 to begin the intensive computation desired by the respective application.

Figure 2:
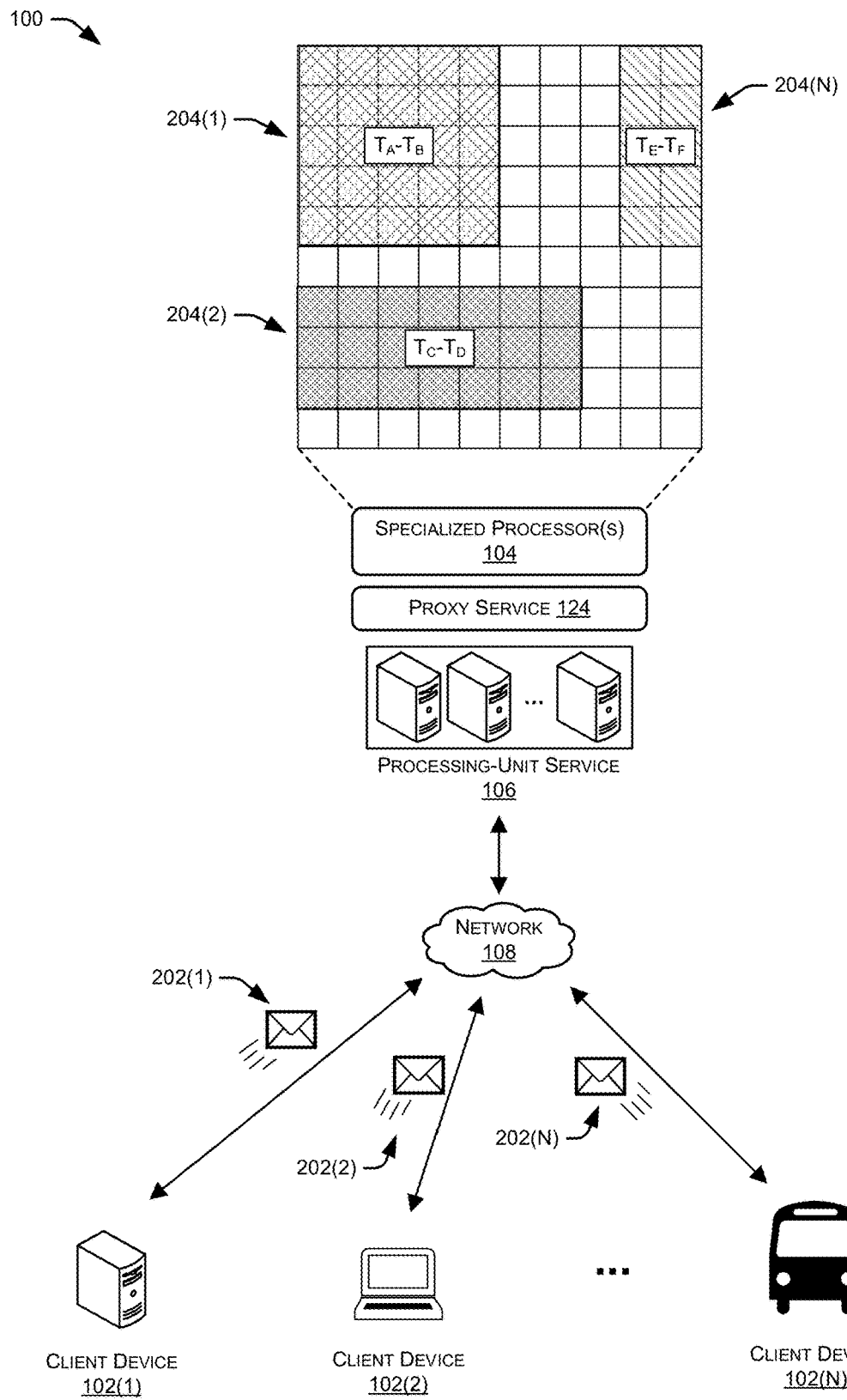
FIG. 2 illustrates an example scenario that may occur within the system of FIG. 1. As illustrated, each of the three illustrated client devices may request use of a respective number of cores of a processing unit of the processing-unit service for a respective amount of time. In response, the proxy service may allocate the cores of the processing unit accordingly.

FIG. 2 illustrates an example scenario that may occur within the environment 100 of FIG. 1. In this example, each of the three illustrated client devices 102(1)-(N) may request use of a respective number of cores of a processing unit of the processing-unit service for a respective amount of time. For example, the client computing device 102(1) may issue a request 202(1) for a number of cores for a particular amount of time, the client computing device 102(2) may issue a request 202(2) for a number of cores for a particular amount of time, and the client computing device 102(N) may issue a request 202(N) for a number of cores for a particular amount of time. As noted above, each respective request 202(1)-(N) may be accompanied with, or may be preceded or proceeded by, one or more parameters in addition to the number of cores and the time desired. These parameters may include an identity of the application or client device, an identity of the task, a QoS associated with the application or client device, security or authentication credentials, and/or the like.

Upon receiving each request, the proxy service 124 may initial use the respective authentication credentials to authenticate (and, potentially, authorize) the respective application or client device. After doing so, the proxy service 124 may use the one or more parameters for determining whether the processing-unit service 106 is able to fulfill the request. If so, the proxy service 124 may reserve the requested cores for the requested amount of time and send an indication of the reservation (including a location of the cores) to the respective application.

In the illustrated example of FIG. 2, the proxy service determines 124 determines that the processing-unit service 106 is able to fulfill each of the three requests 202(1)-(N) and, thus, the proxy service 124 reserves three blocks of cores according to the respective requests and sends respective indications to the requesting applications. For example, FIG. 2 illustrates that the proxy service 124 has reserved a number of cores (25) 204(1) for the request 202(1), a number of cores (21) for the request 202(2), and a number of cores (10) for the request 202(N). Further, FIG. 2 illustrates that the proxy service 124 has reserved the cores 204(1) for a first time range (e.g., $T_A$-$T_B$), the cores 204(2) for a second time range (e.g., $T_C$-$T_D$), and the cores 204(N) for a third time range (e.g., $T_E$-$T_F$). Thus, upon receiving an indication that the cores 204(1) have been reserved for the client device 102(1), the client device 102(1) may begin accessing the cores to perform the desired computations. Similarly, upon receiving an indication that the cores 204(2) have been reserved for the client device 102(2), the client device 102(2) may begin accessing the cores to perform the desired computations and, upon receiving an indication that the cores 204(N) have been reserved for the client device 102(N), the client device 102(N) may begin accessing the cores to perform the desired computations.

Figure 3:
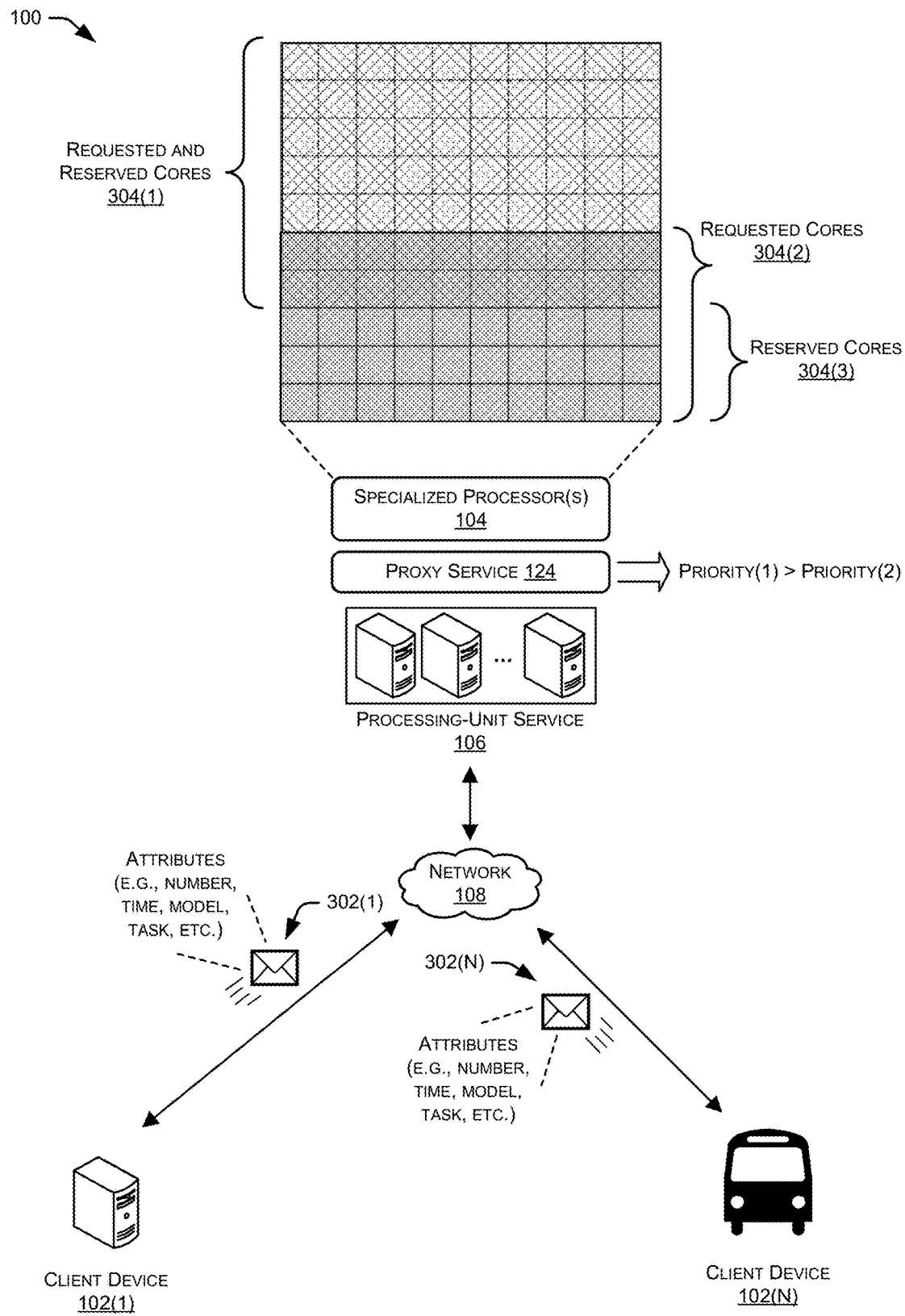
FIG. 3 illustrates another example scenario that may occur within the system of FIG. 1. Here, two client device issue respective requests for cores, with these requests conflicting with one another. For example, the requests may at least partly overlap in time and the processing-unit service may be unable to allocate the number of cores at the desired times for each of the client devices. Thus, the proxy service may determine which request has priority over the other and, in response, may fulfill the higher-priority request while partially fulfilling the lesser-priority request.

FIG. 3 illustrates another example scenario that may occur within the system of FIG. 1. In this example, however, two client device issue respective requests for cores, with these requests conflicting with one another. For example, the requests may at least partly overlap in time and the processing-unit service may be unable to allocate the number of cores at the desired times for each of the client devices. Thus, the proxy service 124 may determine which request has priority over the other and, in response, may fulfill the higher-priority request while partially fulfilling the lesser-priority request.

For example, FIG. 3 illustrates that an application executing on the client device 102(1) may send a first request 302(1) to utilize requested cores 304(1), while the client device 102(N) sends a second request 302(N) to utilize requested cores 304(2). As illustrated, each request may include one or more attributes, as described above.

Upon receiving the requests, the proxy service 124 may determine that the processing-unit service 106 is unable to fulfill both requests simultaneously. Thus, the proxy service 124 may determine which of the requests has a higher priority relative to the other. For example, the proxy service 124 may calculate a priority associated with the first request 302(1) and a priority associated with the second request 302(N) and may compare them to one another to determine which is higher. In this example, the proxy service 124 determines that the request 302(1) is of a higher priority than the request 302(N). Thus, and as illustrated, the proxy service 124 fulfills the request 302(1) by reserving the cores as requested by the client device 102(1) via the request 302(1). Further, the proxy service 124 also determines that it can partially fulfill the request 302(N) by, for example, reserving a portion of the requested cores 304(2), such as cores 304(3). In this example, for instance, the client device 102(N) has requested use of 50 cores, but the processing-unit service 106 is only able to provide access, at the current time to 30 cores. Thus, the proxy service 124 may send a corresponding indication to the client device 102(N). Further, the proxy service 124 may reserve the remaining cores of the request 304(N) when they become available.

Figure 4:
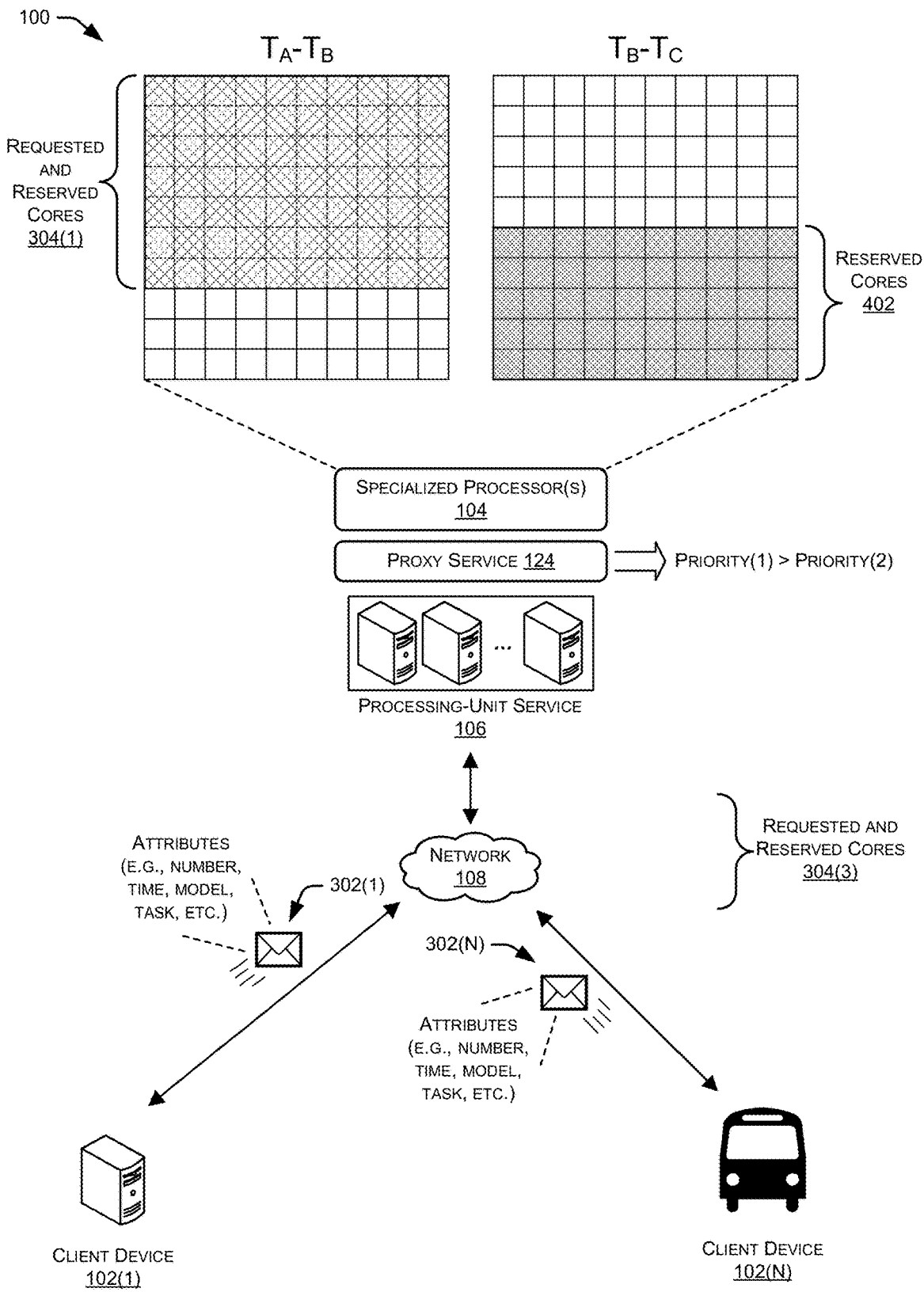
FIG. 4 illustrates another example scenario that may occur within the system of FIG. 1. Again, the two client devices issue conflicting requests, resulting in the proxy service determining which request has priority over the other. In this example, the proxy service may fulfill the higher-priority request at a current time while fulfilling the lesser-priority request at a later time, after completion of the task associated with the higher-priority request.

FIG. 4 illustrates another example scenario that may occur within the environment 100 of FIG. 1. Again, the two client devices issue conflicting requests, resulting in the proxy service 124 determining which request has priority over the other. In this example, the proxy service 124 may fulfill the higher-priority request at a current time while fulfilling the lesser-priority request at a later time, after completion of the task associated with the higher-priority request.

For example, FIG. 4 again illustrates that an application executing on the client device 102(1) may send the first request 302(1) to utilize requested cores 304(1), while the client device 102(N) sends the second request 302(N) to utilize the requested cores 304(2) illustrated in FIG. 3. Again, each request may include one or more attributes, as described above.

Upon receiving the requests, the proxy service 124 may determine that the processing-unit service 106 is unable to fulfill both requests simultaneously. Thus, the proxy service 124 may determine which of the requests has a higher priority relative to the other. For example, the proxy service 124 may calculate the priority associated with the first request 302(1) and the priority associated with the second request 302(N) and may compare them to one another to determine which is higher. In this example, the proxy service 124 determines that the request 302(1) is of a higher priority than the request 302(N). Thus, and as illustrated, the proxy service 124 fulfills the request 302(1) by reserving the cores as requested by the client device 102(1) via the request 302(1).

In this example, however, rather than partially fulfilling the request 302(N) by, for example, reserving a portion of the requested cores 304(2), such as cores 304(3), the proxy service 124 may send an indication that the requested cores will become available after a certain delay. Thus, the proxy service 124 may send a corresponding indication to the client device 102(N) indicating that cores 402 will become available at a specified later time. The client device 102(N) may utilize the reserved cores 402 at the later time, as specified by the proxy service 124.

Figure 5:
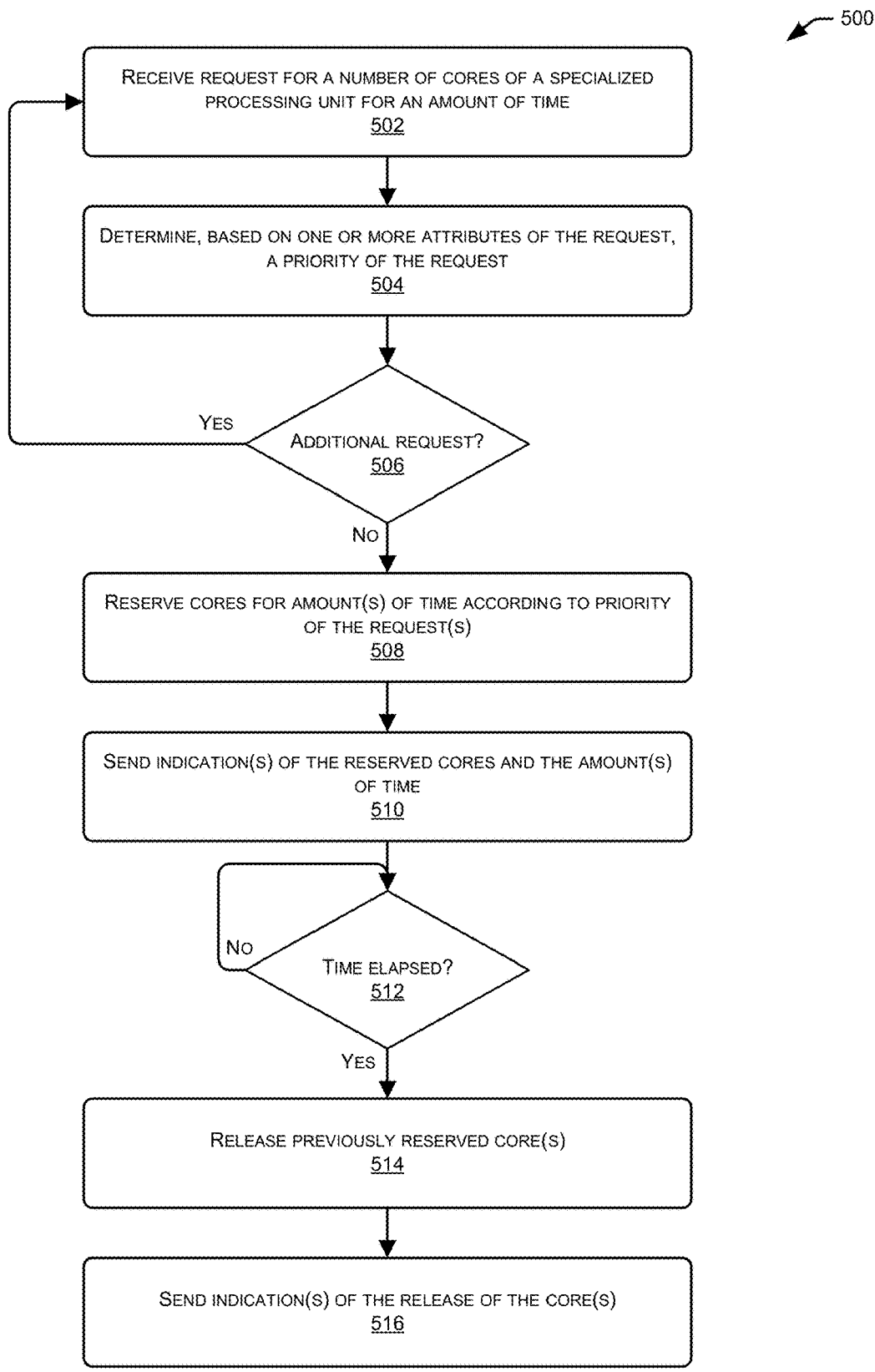
FIG. 5 illustrates a flow diagram of an example process for receiving requests for use of cores of one or more specialized processing units and, in response, prioritizing the requests and allocating the cores accordingly.

FIG. 5 illustrates a flow diagram of an example process 500 for receiving requests for use of cores of one or more specialized processing units and, in response, prioritizing the requests and allocating the cores accordingly. In some instances, the processing-unit service 106 described above may perform some or all of the operations of the process 500. Of course, while the operations are described below with reference to a server of processing-unit service 106, it is to be appreciated that other systems, devices, and/or the like may perform some or all of these operations in other instances.

At an operation 502, the processing-unit service 106 receives a request for a number of cores of a specialized processing unit (e.g., GPU, TPU, edge-TPU, etc.) for an amount of time. For example, the proxy service 124 may receive such a request from one of the illustrated client computing devices 102(1)-(N). As described above, this request may include one or more attributes or parameters in addition to the number of cores and the time requested. At an operation 504, the processing-unit service 106 analyzes the request to determine one or more of these attributes associated with the request.

An operation 506 represents the processing-unit service 106 determining whether the processing-unit service 106 has received an additional request. If so, the process 500 loops back to the operations 502 and 504 for the new request. If not, then at an operation 508 the processing-unit service 106 reserves one or more cores for respective amounts of times according to priorities of the requests. That is, the proxy service 124 may determine priorities of the requests and may reserve cores associated with a highest-priority request, followed by requests of descending priority. At an operation 510, the processing-unit service 106 sends indications of the reservations to the requesting applications.

At an operation 512, the processing-unit service 106 determines whether any of the amounts of time have elapsed. Upon determining that an amount of time associate with a particular reservation has elapsed, at an operation 514 the processing-unit service 106 may release the previously reserved cores and, at an operation 516, send an indication of the release of the cores to the corresponding application.

Figure 6A:
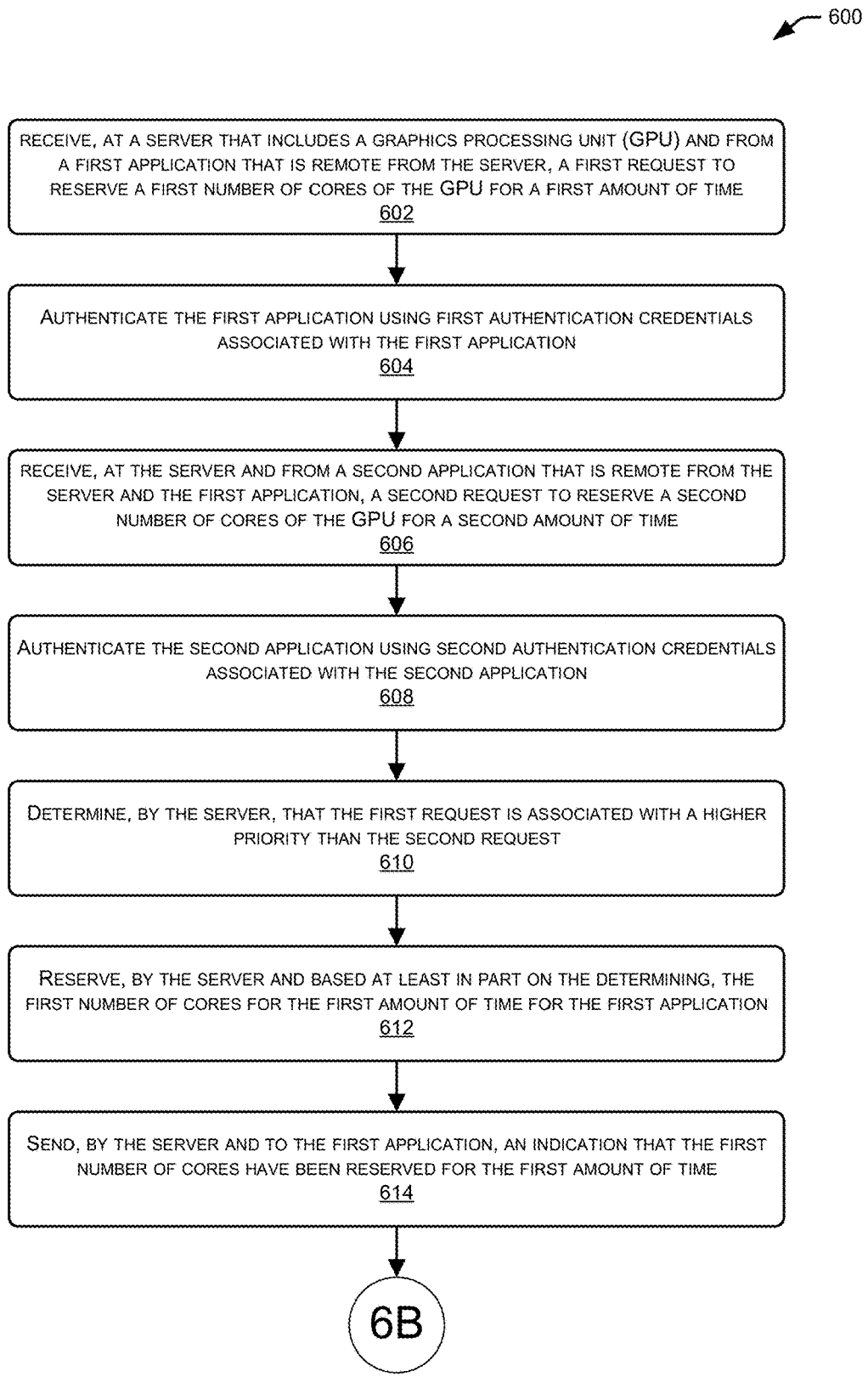
FIGS. 6A-B collectively illustrate a flow diagram of another example process for receiving two respective requests for use of cores from respective applications and, in response, prioritizing the requests and allocating the cores accordingly.
Figure 6B:
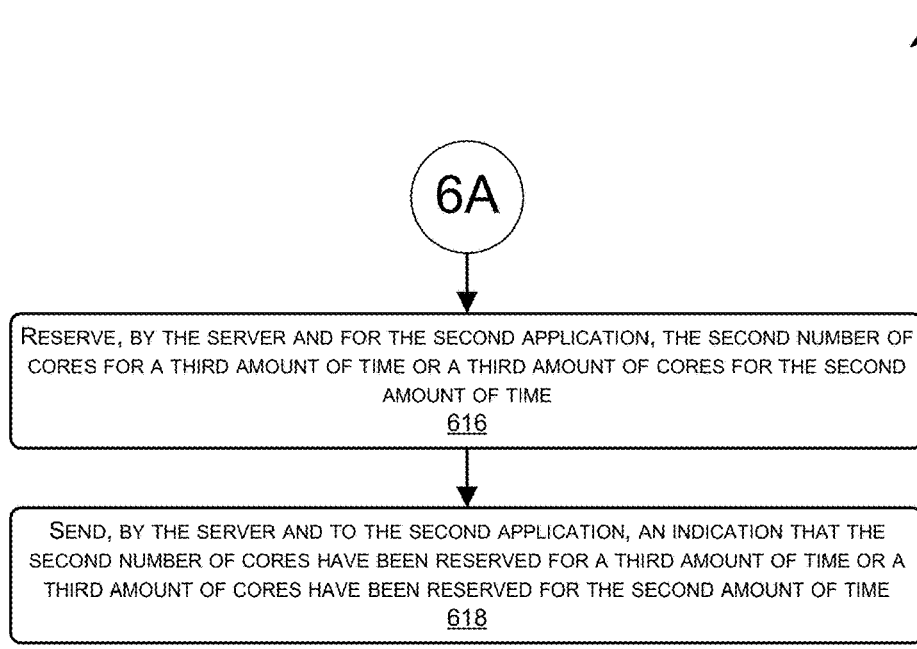

FIGS. 6A-B collectively illustrate a flow diagram of another example process 600 for receiving two respective requests for use of cores from respective applications and, in response, prioritizing the requests and allocating the cores accordingly. Again, the processing-unit service 106 described above may perform some or all of the operations of the process 600 and/or other systems, devices, and/or the like may perform some or all of these operations. Further, while the process 600 is described with reference to reserving GPUs in a FaaS model, it is to be appreciate the operations of the process 600 may be similarly implemented for other specialized processing units, such as TPUs, edge-TPUs, and/or other high-power processing units.

An operation 602 represents receiving, at a server of the processing-unit service 106 that includes a graphics processing unit (GPU) and from a first application that is remote from the server, a first request to reserve a first number of cores of the GPU for a first amount of time. In some instances, this request includes authentication credentials of the first application. An operation 604, meanwhile, represents authenticating, at least partly prior to the reserving of the first number of cores, the first application using the first authentication credentials associated with the first application.

An operation 606 represents receiving, at the server of the processing-unit service 106 and from a second application that is remote from the server and remote from the first application, a second request to reserve a second number of cores of the GPU for a second amount of time. In some instances, this request includes authentication credentials of the second application. An operation 608, meanwhile, represents authenticating, at least partly prior to the reserving of the second number of cores, the first application using the second authentication credentials associated with the second application.

After receiving the two requests, the server of the processing-unit service 106 may determine, at an operation 610, that the first request is associated with a higher priority than the second request. In response, and at an operation 612, the server of the processing-unit service 106 reserves the first number of cores for the first amount of time for the first application and, at an operation 614, sends, to the first application, an indication that the first number of cores have been reserved for the first amount of time for the first application.

FIG. 6B continues the illustration of the process 600 and includes, at an operation 616, reserving, by the server and based at least in part on the determining, at least one of: (i) a third number of cores for the second amount of time for the second application, the third amount of cores being less than the second amount of cores requested by the second application, or (ii) the second number of cores for a third amount of time for the second application, the third amount of time at least one of less than the second amount of time or occurring later than the second amount of time. In other words, the processing-unit service 106 may reserve a portion of the cores requested by the second application at the requested time (e.g., as illustrated in FIG. 3), may reserve each of the requested cores at a later time (e.g., as illustrated in FIG. 4), or may do a combination thereof. At an operation 618, the processing-unit service 106 sends an indication of the reservation to the second application.

Figure 7:
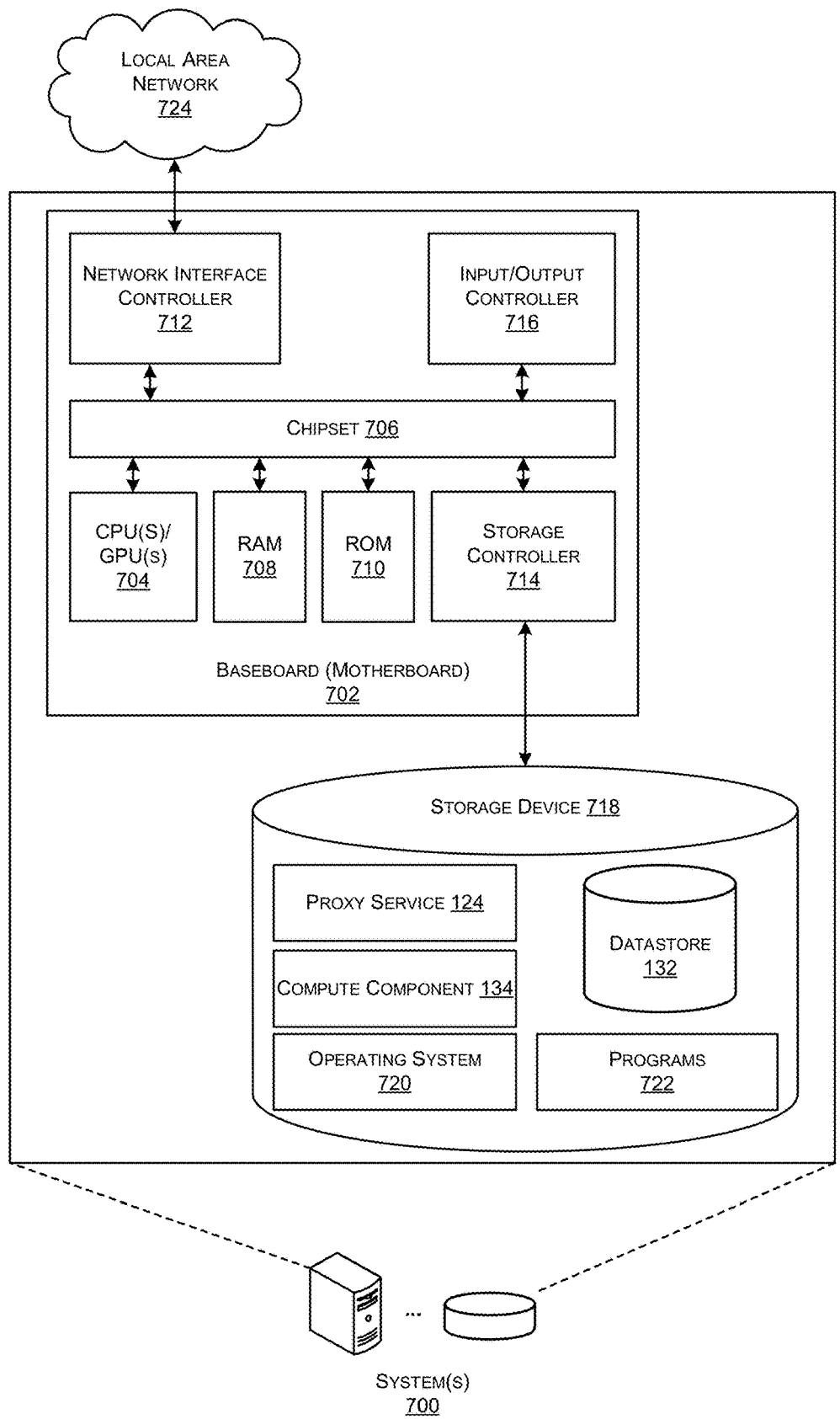
FIG. 7 is a computer architecture diagram showing an illustrative computer hardware architecture for implementing computing devices configured to implement the techniques described herein.

FIG. 7 is a computer architecture diagram showing an illustrative computer hardware architecture for implementing a system 700 that can be utilized to implement aspects of the various technologies presented herein. The system 106, discussed above, may include some or all of the components discussed below with reference to the system 700.

As mentioned above, the computing resources provided by a cloud computing network, data center, or the like can be data processing resources such as VM instances or hardware computing systems, database clusters, computing clusters, storage clusters, data storage resources, database resources, networking resources, and others. Some of the systems 700 can also be configured to execute a resource manager capable of instantiating and/or managing the computing resources. In the case of VM instances, for example, the resource manager can be a hypervisor or another type of program configured to enable the execution of multiple VM instances on a single server system 700. Systems 700 in a data center can also be configured to provide network services and other types of services.

The system 700 includes a baseboard 702, or "motherboard," which is a printed circuit board to which a multitude of components or devices can be connected by way of a system bus or other electrical communication paths. In one illustrative configuration, one or more processing units 704, such as central processing units (CPUs) operate in conjunction with a chipset 706. The CPUs 704 can be standard programmable processors that perform arithmetic and logical operations necessary for the operation of the system 700. The processing units 704 may further include one or more GPUs, TPUs, edge-TPUs and/or other types of specialized processing units for use by client computing devices operating remote from the systems 700, as described above.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the system 700. The chipset 706 can further provide an interface to a computer-readable storage medium such as a read-only memory (ROM) 510 or non-volatile RAM (NVRAM) for storing basic routines that help to startup the system 700 and to transfer information between the various components and devices. The ROM 710 or NVRAM can also store other software components necessary for the operation of the system 700 in accordance with the configurations described herein.

The system 700 can operate in a networked environment using logical connections to remote computing devices and computer systems through a network, such as a local area network 724. The chipset 706 can include functionality for providing network connectivity through a Network Interface Card (NIC) 712, such as a gigabit Ethernet adapter. The NIC 712 is capable of connecting the system 700 to other computing devices over the network. It should be appreciated that multiple NICs 712 can be present in the system 700, connecting the computer to other types of networks and remote computer systems.

The system 700 can be connected to a storage device 718 that provides non-volatile storage for the computer. The storage device 718 can store an operating system 720, programs 722, and data, which have been described in greater detail herein. The storage device 718 can be connected to the system 700 through a storage controller 714 connected to the chipset 706. The storage device 718 can consist of one or more physical storage units. The storage controller 714 can interface with the physical storage units through a serial attached SCSI (SAS) interface, a serial advanced technology attachment (SATA) interface, an FC interface, or other type of interface for physically connecting and transferring data between computers and physical storage units.

The system 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the system 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The system 700 can further read information from the storage device 718 by detecting the physical states or characteristics of one or more particular locations within the physical storage units.

In addition to the mass storage device 718 described above, the system 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the system 700.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the system 700. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 718 can store other system or application programs and data utilized by the system 700.

In one embodiment, the storage device 718 or other computer-readable storage media is encoded with computer-executable instructions which, when loaded into the system 700, transform the computer from a general-purpose computing system into a special-purpose computer capable of implementing the embodiments described herein. These computer-executable instructions transform the system 700 by specifying how the CPUs 704 transition between states, as described above. According to one embodiment, the system 700 has access to computer-readable storage media storing computer-executable instructions which, when executed by the system 700, perform the various processes described above with regard to FIGS. 2A-3D. The system 700 can also include computer-readable storage media having instructions stored thereupon for performing any of the other computer-implemented operations described herein.

The system 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the system 700 might not include all of the components shown in FIG. 7, can include other components that are not explicitly shown in FIG., or might utilize an architecture completely different than that shown in FIG. 7.

The system 700 may also store, in the storage device 718, the proxy service 124, the compute component 134, and/or the data store 132 for performing some or all of the techniques described above with reference to FIGS. 1-6B.

Further, the architectures and systems described herein may comprise an array of computing devices, such as gateways, routers, network bridges, modems, wireless access points, networking cables, line drivers, switches, hubs, protocol converters, servers, firewalls, network address translators, multiplexers, network interface controllers, wireless network interface controllers, terminal adapters, and/or the like. In some examples, the networks comprise a data center or cloud-computing network comprising servers and other network components (e.g., routers, switches, etc.) stored across multiple data centers located across geographic areas. In these instances, the cloud-computing environment may be a distributed network through which users (often customers) may interact via user devices to manage or otherwise interact with service provided by the cloud computing network. The cloud computing network may provide on-demand availability of computing system resources, such as data storage, computing power (e.g., CPU, GPU, etc.), networking, databases, etc., without direct active management by users. In some examples, the cloud computing network may be managed and maintained by a service provider such that users do not have to invest in and maintain the computing infrastructure for their computing resource needs. Generally, a user may be provided access to, or allocated use of, a portion of the computing resources in the cloud computing network. The cloud computing network may scale, such as by spinning up resources or spinning down resources, based on demand for the individual users. The portions of the cloud computing network may be allocated using hardware virtualization such that portions of the cloud computing network can be configured and managed by the user (e.g., security configuration, load balancing configuration, etc.). However, the cloud computing network need not be managed by a service provider, and can be managed by any entity, including the user themselves that run the applications or services.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5 and 6A-B, and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:

receiving, at a server that includes a graphics processing unit (GPU) and from a first application hosted on a first edge node that is remote from the server, a first request to reserve a first number of cores of the GPU during a first period of time;

receiving, at the server and from a second application hosted on a second edge node that is remote from the server and remote from the first edge node, a second request to reserve a second number of the cores of the GPU during a second period of time that at least partly overlaps the first period of time;

determining, by the server, that the first application is associated with a higher priority than the second application;

reserving, by the server and based at least in part on the determining that the first application is associated with the higher priority, the first number of the cores during the first period of time for the first application; and sending, by the server and to the first application, an indication that the first number of the cores have been reserved for the first period of time for the first application.

2. The method as recited in claim 1, further comprising:
reserving, by the server and based at least in part on the determining that the first application is associated with the higher priority, a third number of the cores during the second period of time for the second application, the third number of the cores being less than the second number of the cores requested by the second application; and
sending, by the server and to the second application, an indication that the third number of the cores have been reserved for the second period of time for the second application.

3. The method as recited in claim 1, further comprising:
reserving, by the server and based at least in part on the determining that the first application is associated with the higher priority, the second number of the cores during a third period of time for the second application, the third period of time at least one of less than the second period of time or occurring later than the second period of time; and
sending, by the server and to the second application, an indication that the second number of the cores have been reserved for the third period of time for the second application.

4. The method as recited in claim 1, wherein the determining that the first request is associated with a higher priority than the second request is based at least in part on at least one of a task to be performed by the first application, a task to be performed by the second application, a quality of service (QoS) level associated with the first application, a QoS level associated with the second application, a billing model associated with the first application, or a billing model associated with the second application.

5. The method as recited in claim 1, wherein the determining that the first request is associated with a higher priority than the second request is based at least in part on at least one of the first number of the cores requested by the first application, the first period of time during which the first application has requested the first number of the cores, the second number of the cores requested by the second application, or the second period of time during which the second application has requested the second number of the cores.

6. The method as recited in claim 1, wherein the server forms a portion of a cloud-based service, the receiving of the first request comprises receiving the first request via an application programming interface (API) provided by the cloud-based service, and the receiving of the second request comprises receiving the second request via the API provided by the cloud-based service.

7. The method as recited in claim 1, wherein the first request includes first authentication credentials associated with the first application, and the method further comprising:
authenticating, at least partly prior to the reserving of the first number of the cores and the sending of the indication, the first application using the first authentication credentials associated with the first application.

8. The method as recited in claim 1, wherein the first application is configured to utilize computing resources of the first edge node to execute first tasks and utilize the cores of the GPU to execute second tasks, the second tasks different from the first tasks.

9. A system comprising:
one or more first processors including at least one of a graphics processing unit (GPU) or a tensor processing unit (TPU);
one or more second processors; and
one or more non-transitory computer-readable media storing computer-executable instructions that, when executed, cause the one or more second processors to perform acts comprising:
receiving, from a first application hosted on a first edge node that is remote from the system, a first request to reserve a first number of cores of the at least one of the GPU or the TPU during a first period of time;
receiving, from a second application hosted on a second edge node that is remote from the system and remote from the first edge node, a second request to reserve a second number of the cores of the at least one of the GPU or the TPU during a second period of time that at least partly overlaps the first period of time;
determining that the first application is associated with a higher priority than the second application;
reserving, based at least in part on the first application being associated with the higher priority, the first number of the cores during the first period of time for the first application; and
sending, to the first application, an indication that the first number of the cores have been reserved for the first period of time for the first application.

10. The system as recited in claim 9, the acts further comprising:
reserving, based at least in part on the determining that the first application is associated with the higher priority, a third number of the cores during the second period of time for the second application, the third number of the cores being less than the second number of the cores requested by the second application; and
sending, to the second application, an indication that the third number of the cores have been reserved for the second period of time for the second application.

11. The system as recited in claim 9, the acts further comprising:
reserving, based at least in part on the determining that the first application is associated with the higher priority, the second number of the cores during a third period of time for the second application, the third period of time at least one of less than the second period of time or occurring later than the second period of time; and
sending, to the second application, an indication that the second number of the cores have been reserved for the third period of time for the second application.

12. The system as recited in claim 9, wherein the determining that the first request is associated with a higher priority than the second request is based at least in part on at least one of a task to be performed by the first application, a task to be performed by the second application, a quality of service (QoS) level associated with the first application, a QoS level associated with the second application, a billing model associated with the first application, or a billing model associated with the second application.

13. The system as recited in claim 9, wherein the determining that the first request is associated with a higher priority than the second request is based at least in part on at least one of the first number of the cores requested by the first application, the first period of time during which the first application has requested the first number of the cores, the second number of the cores requested by the second application, or the second period of time during which the second application has requested the second number of the cores.

14. The system as recited in claim 9, wherein the system forms a portion of a cloud-based service, the receiving of the first request comprises receiving the first request via an application programming interface (API) provided by the cloud-based service, and the receiving of the second request comprises receiving the second request via the API provided by the cloud-based service.

15. A method implemented at least in part by a system that includes a specialized processing unit, the method comprising:
- receiving, from a first application hosted on a first edge node that is remote from the system, a first request to reserve a first number of cores of the specialized processing unit during a first period of time;
- receiving, from a second application hosted on a second edge node that is remote from the system and remote from the first edge node, a second request to reserve a second number of the cores of the specialized processing unit during a second period of time that at least partly overlaps the first period of time;
- determining that the first application is associated with a higher priority than the second application;
- reserving, based at least in part on the determining that the first application is associated with the higher priority, the first number of the cores during the first period of time for the first application; and
- sending, to the first application, an indication that the first number of the cores have been reserved for the first period of time for the first application.

16. The method as recited in claim 15, wherein the specialized processing unit comprises at least one of a graphics processing unit (GPU) or a tensor processing unit (TPU).

17. The method as recited in claim 15, further comprising:
- reserving, based at least in part on the determining that the first application is associated with the higher priority, a third number of the cores during the second period of time for the second application, the third number of the cores being less than the second number of the cores requested by the second application; and
- sending, to the second application, an indication that the third number of the cores have been reserved for the second period of time for the second application.

18. The method as recited in claim 15, further comprising:
- reserving, based at least in part on the determining that the first application is associated with the higher priority, the second number of the cores a third period of time for the second application, the third period of time at least one of less than the second period of time or occurring later than the second period of time; and
- sending, to the second application, an indication that the second number of the cores have been reserved for the third period of time for the second application.

19. The method as recited in claim 15, wherein the determining that the first request is associated with a higher priority than the second request is based at least in part on at least one of a task to be performed by the first application, a task to be performed by the second application, a quality of service (QoS) level associated with the first application, a QoS level associated with the second application, a billing model associated with the first application, or a billing model associated with the second application.

20. The method as recited in claim 15, wherein the determining that the first request is associated with a higher priority than the second request is based at least in part on at least one of the first number of the cores requested by the first application, the first period of time during which the first application has requested the first number of the cores, the second number of the cores requested by the second application, or the second period of time during which the second application has requested the second number of the cores.

* * * * *